US006970282B2

(12) United States Patent
Guo et al.

(10) Patent No.: US 6,970,282 B2
(45) Date of Patent: Nov. 29, 2005

(54) MICRO MIRROR DEVICE WITH SPRING AND METHOD FOR THE SAME

(75) Inventors: James Guo, Corvallis, OR (US); Adel Jilani, Corvallis, OR (US); Kenneth Faase, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/039,418

(22) Filed: Jan. 19, 2005

(65) Prior Publication Data

US 2005/0122562 A1 Jun. 9, 2005

Related U.S. Application Data

(63) Continuation of application No. 10/678,007, filed on Oct. 2, 2003, now Pat. No. 6,894,824.

(51) Int. Cl.[7] .............................................. G02B 26/00
(52) U.S. Cl. ..................... 359/290; 359/224; 359/872
(58) Field of Search ................................. 359/224, 290, 359/872

(56) References Cited

U.S. PATENT DOCUMENTS

| 5,579,151 | A | 11/1996 | Cho |
| 5,631,764 | A | 5/1997 | Chae |
| 5,646,772 | A | 7/1997 | Yurke |
| 5,654,819 | A | 8/1997 | Goossen et al. |
| 5,703,728 | A | 12/1997 | Smith et al. |
| 5,745,281 | A | 4/1998 | Yi et al. |
| 5,867,202 | A | 2/1999 | Knipe et al. |
| 5,995,071 | A | 11/1999 | Mertz |
| 6,147,790 | A | 11/2000 | Meier et al. |
| 6,285,490 | B1 | 9/2001 | Meier et al. |
| 6,614,581 | B2 * | 9/2003 | Anderson ............... 359/295 |
| 6,894,824 | B2 * | 5/2005 | Guo et al. ............... 359/291 |

* cited by examiner

Primary Examiner—Hung Xuan Dang
Assistant Examiner—Joseph Martinez

(57) ABSTRACT

A method and apparatus providing a micro-mirror device configured to increase a switching frequency thereof. The micro-mirror device includes a substrate with at least one address electrode positioned over the substrate to provide an electrostatic force and includes at least one support member positioned over the substrate and extending upward above the substrate. The micro-mirror device also includes a mirror and a spring member. The mirror is disposed over the at least one address electrode and coupled to the at least one support member. The mirror is configured to deflect toward the substrate in response to the at least one address electrode applying the electrostatic force to the mirror. The spring member is spaced apart between the substrate and the mirror and coupled to the at least one support member. The spring member is operable to deflect separately from the mirror and toward the substrate.

11 Claims, 3 Drawing Sheets

MICRO MIRROR DEVICE WITH SPRING AND METHOD FOR THE SAME

This U.S. Patent application is a continuation of U.S. patent application Ser. No. 10/678,007 filed Oct. 2, 2003 now U.S. Pat. No. 6,894,824, which is incorporated by reference in its entirety herein.

FIELD OF THE INVENTION

The present invention relates generally to micro-electromechanical systems for a display system. More particularly, the present invention relates to actuation of a micro-mirror device.

BACKGROUND OF THE INVENTION

Micro-mirror devices are well known and often referred to as micro-electromechanical systems (MEMS). Such micro-mirror devices have been formed on insulators or other substrates using commonly known micro-electronic fabrication techniques, such as photolithography, vapor deposition, and etching. The micro-mirror device can be operated as a light modulator for amplitude and/or phase modulation of incident light. One application of a micro-mirror device is within a display system. As such, multiple micro-mirror devices are arranged in an array such that each micro-mirror device provides one cell or pixel of the display system.

One conventional micro-mirror device includes an electro-statically actuated mirror immersed in a gas. The mirror pivots or rotates on a hinge about a mirror axis to different predetermined positions for reflecting light at such predetermined positions. However, there is often a design dilemma with respect to the stiffness of the hinge. Specifically, a weak hinge is often desired for deflecting the mirror to a maximum deflected position, since the weak hinge requires less applied voltage to deflect the mirror. On the other hand, a stiff hinge allows the mirror to spring-back faster from one deflected position to another deflected position. The stiff hinge is favorable in overcoming the gas dampening and reducing the transition time or frequency of the mirror pivoting between different deflected positions. However, the stiff hinge requires a greater voltage for deflecting the mirror.

In addition, another problem for some micro-mirror devices relates to the switching frequency or speed by which the mirror can pivot. In particular, the mirror often has a tendency to stick to the landing sites due to a variety of forces such as the van der Waals force generated by water vapor present on the device surface and intermetallic bonding. Such sticking directly reduces the switching frequency by which the mirror can pivot from one position to another.

Another conventional micro-mirror device includes an electrostatically actuated mirror immersed in a dielectric liquid. This type of micro-mirror device, however, experiences a severe dampening effect from the mirror pivoting in the dielectric liquid. Such a dampening effect results in loss of speed and frequency of the pivoting mirror, which causes limitations in the type of applications by which the micro-mirror devices can be implemented with and/or causes a corresponding time-delay by which images are clearly viewed in, for example, a display system.

Therefore, there exists a need in the art to provide a micro-mirror device with increased speed and frequency in the actuation of the micro-mirror device while also requiring less voltage applied to pivot the mirror. Further, there exists a need in the art to provide a micro-mirror device that overcomes the dampening effect from the mirror actuating in the dielectric liquid.

SUMMARY OF THE INVENTION

The present invention relates to a method and apparatus providing a micro-mirror device. The micro-mirror device includes a substrate with at least one address electrode positioned over the substrate and configured to provide an electrostatic force. The substrate also includes at least one support member positioned over the substrate and extending upward above the substrate. The micro-mirror device also includes a mirror and a spring member. The mirror is disposed over the at least one address electrode and coupled to the at least one support member. The mirror is configured to deflect toward the substrate in response to the at least one address electrode applying the electrostatic force to a portion of the mirror. The spring member is spaced apart between the substrate and the mirror and coupled to the at least one support member. The spring member is operable to deflect separately from the mirror and toward the substrate.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

While the specification concludes with claims particularly pointing out and distinctly claiming that which is regarded as the present invention, the advantages of this invention may be ascertained from the following description of the invention when read in conjunction with the accompanying drawings, in which:

DETAILED DESCRIPTION

Figure 1:
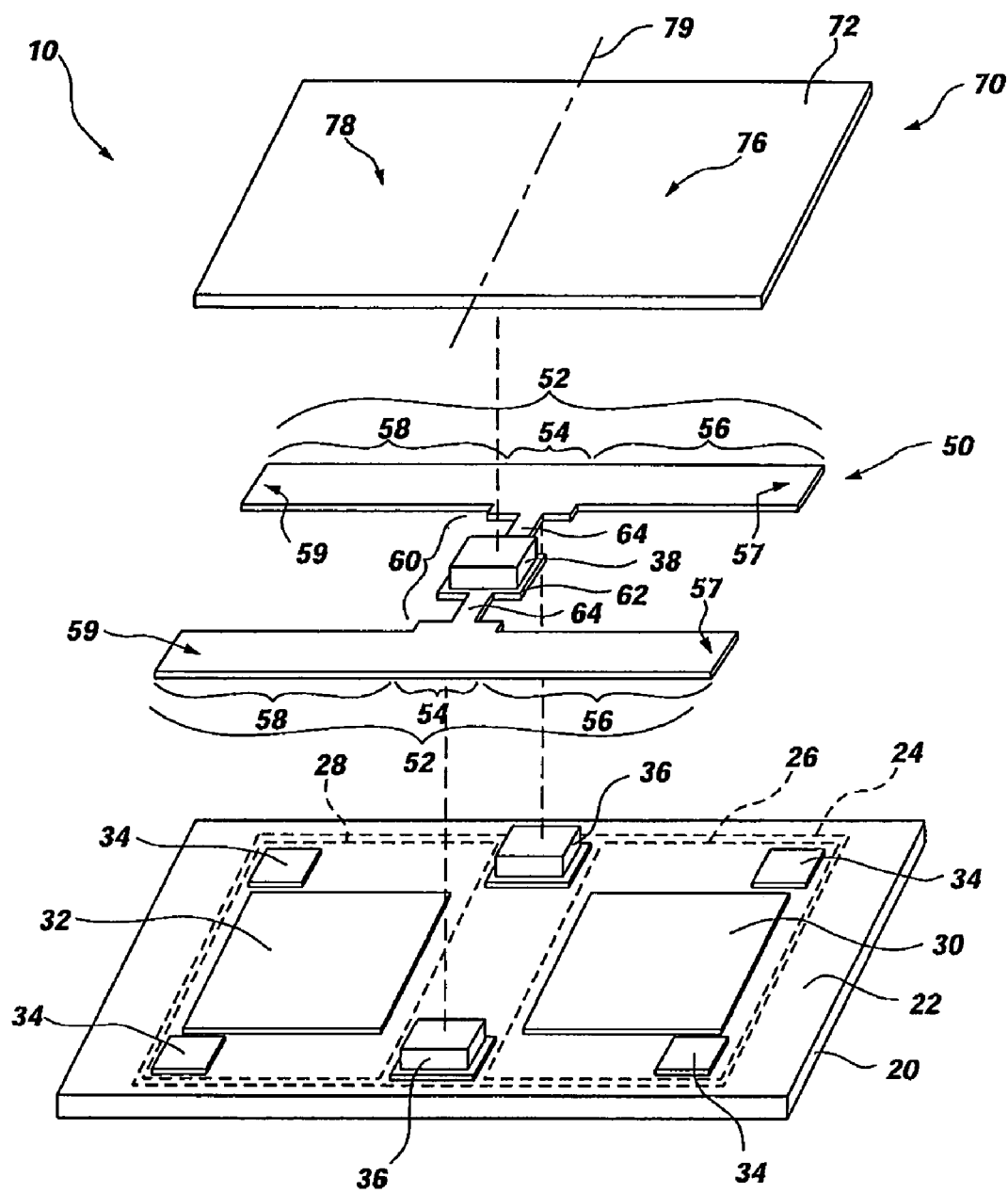
FIG. 1 illustrates an exploded perspective view of a micro-mirror device, depicting a substrate with address electrodes formed thereon, a spring member and a mirror, according to an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2:
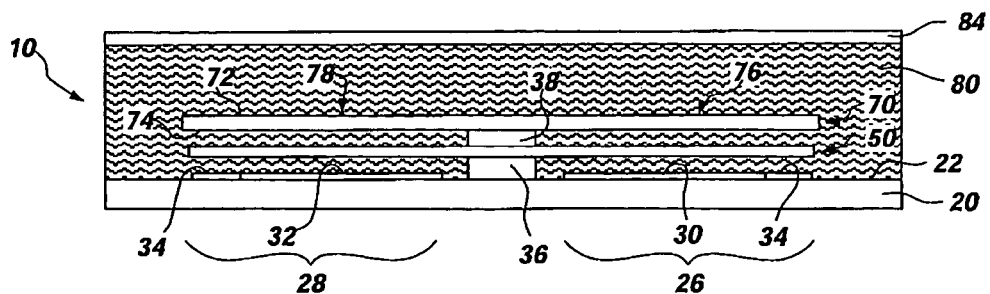
FIG. 2 illustrates a side view of the micro-mirror device, depicting the micro-mirror device immersed in a dielectric liquid and in a neutral position, according to an embodiment of the present invention.

FIGS. 1 and 2 illustrate an embodiment of a micro-mirror device 10. The micro-mirror device 10 includes a substrate 20 having address electrodes formed thereon with a spring member 50 and a mirror 70 spaced apart over the substrate 20 and supported above the substrate 20 with one or more support members. Such a micro-mirror device can be submerged within a dielectric liquid 80. The micro-mirror device 10 is configured to generate an electrostatic force to effect movement of the micro-mirror device 10 within the dielectric liquid 80. In particular, the address electrodes can be configured to generate the electrostatic force to discreetly deflect each of the spring member 50 and the mirror 70 toward the substrate 20 and configured to release the electrostatic force so that stored energy in the spring member 50 assists in forcing the mirror upward.

As well known by one skilled in the art, such a micro-mirror device 10 can be used in a display (not shown) to constitute a light modulator for modulation of incident light and can provide one cell or pixel in the display. Further, the micro-mirror device can be used in various imaging systems, such as projectors, video applications, or any other suitable imaging system known in the art, such as optical addressing applications.

The substrate 20 includes an upper surface 22 with a device region 24 defining an area by which a single micro-mirror device 10 can be positioned and formed. Further, the device region 24 can define first and second sides 26 and 28 thereof, which can define the sides by which the spring member 50 and the mirror 70 deflect toward. As such, the micro-mirror device 10 can be symmetrically centered over the first and second sides 26 and 28 of the device region 24.

In one embodiment, the deflection of the spring member 50 and the mirror 70 can be implemented with first and second address electrodes 30 and 32 formed on respective first and second sides 26 and 28 of the substrate 20. The first side 26 of the substrate 22 can include one or more first address electrodes 30. Likewise, the second side 28 of the substrate 20 can include one or more second address electrodes 32. The first and second address electrodes 30 and 32 can be positioned symmetrically within the device region 24 or any suitable position so as to provide and generate an electrostatic force for deflecting the spring member 50 and the mirror 70.

The first and second address electrodes 30 and 32 generate the electrostatic force by a voltage being applied thereto. The voltage can alternate between the respective first and second address electrodes 30 and 32 to facilitate actuating the mirror between first and second positions, described in more detail below. The substrate 20 can also include logic circuitry (not shown) to drive and control the first and second address electrodes 30 and 32, such as complementary metal oxide semi-conductor (CMOS) structures formed in the substrate as known by one of ordinary skill in the art. As such, the substrate 20 can include an insulator material and/or a semiconductor material, or any other suitable material known in the art.

In addition, the substrate 20 can include one or more landing pads 34, and preferably, four landing pads positioned and defined at each corner of the device region 24 on the upper surface 22 of the substrate 20. The landing pads 34 can be positioned so that the spring member 50 directly contacts at least some of the landing pads 34 when the spring member 50 is in a deflected position. Further, in one embodiment, the landing pads 34 can be coated with a dielectric film and configured to provide an additional electrostatic force, alternating between the landing pads 34 on the first and second sides 26 and 28 of the substrate 20 and directed to the spring member 50. The alternating electrostatic force provided by the landing pads 34 can correspond with the alternation of the electrostatic force provided by the first and second electrodes, as previously set forth. As such, the landing pads 34 can provide a surface for the spring member 50 to directly contact when in a maximum deflected position as well as provide an electrostatic force to the spring member 50 to assist (along with the electrodes) in deflecting the spring member 50. The landing pads 34 can also serve to solely deflect the spring member 50.

In one embodiment, the deflection of the spring member 50 and/or the mirror 70 can be effected by a piezoelectric element formed in the spring member 50 or within a hinge configured to deflect the mirror 70. As can be implemented and known by those of ordinary skill in the art, the piezoelectric element can be utilized in addition to the electrostatic force or utilized solely to deflect the spring member 50 and/or the mirror 70.

As previously set forth, the substrate 20 can also include one or more support members within the device region 24. The one or more support members can include lower support members 36 and a middle or upper support member 38. The upper support member 38 will be described in further detail below. The lower support members 36 can be formed as a post like structure or any other suitable type structure. The lower support members 36 can be positioned within the device region 24, one at a front central side and the other at a rear central side of the device region 24. The lower support members 36 can be configured to be coupled to and support the spring member 50 and can serve as a spacer to separate the spring member 50 from the upper surface 22 of the substrate 20.

The spring member 50 can include, but is not limited to, an H-shaped configuration. With this configuration, the spring member 50 can include a central portion 60 and two substantially parallel elongate spring portions 52. The central portion 60 can extend substantially orthogonal with respect to the elongate spring portions 52 and can be integrally formed with a mid portion 54 of the elongate portions at opposing ends of the central portion 60. Such a spring member 50 can be formed of any suitable conductive material that will react and deflect in response to the electrostatic force provided by the electrodes and/or landing pads. Examples of suitable materials for the spring member 50 can include, but are not limited to, aluminum or an alloy thereof, such as aluminum copper, aluminum titanium or any other suitable conductive material known in the art. The spring member 50 can also be coated with a dielectric film.

The spring member 50 can be configured to be positioned over, coupled to and/or formed with a top surface of the lower support members 36 at the mid portion 54 of the elongate spring portions 52. In one embodiment, the spring member 50 can be integrally formed with the lower support members 54 so that the lower support members 54 are formed with, at least partially, the same material as the spring member 50. In either case, each of the elongate spring portions 52 can be symmetrically positioned over and/or integrally formed with the respective lower support members 54 to define first and second elongate portions 56 and 58 extending over respective first and second sides 26 and 28 of the substrate 20. With this arrangement, each of the first and second elongate portions 56 and 58 can each include respective first and second free ends 57 and 59 that extend a length to be disposed over and above one of the landing pads 34 and are spaced apart from the landing pads 34 via the lower support members 36 while the spring member 50 is in a neutral position (FIG. 2). Further, each of the first and second elongate portions 56 and 58 can extend over the respective first and second sides 26 and 28 of the substrate 20 in a cantilevered manner.

The central portion 60 of the spring member 50 can serve, at least in part, as a hinge for the mirror to actuate or pivot. The central portion 60 can define a central head portion 62 with neck portions 64 on opposing sides of the head portion 62. The head portion 62 can include and support the before mentioned upper support member 38 positioned and formed on the head portion 62. Such an upper support member 38 can be a post type structure and can be configured to support the mirror 70 as well as serve as a spacer between the mirror 70 and the spring member 50. The neck portions 64 can be narrower than the head portion 62 to facilitate a hinge type arrangement for the mirror 70. With the mirror 70 coupled to the upper support member 38, such neck portions defined on opposing sides of the head portion 62 can be configured to twist as the mirror 70 is deflected in one or more positions. In this manner, the central portion 60 of the spring member 50 can serve as the hinge for the mirror to pivot and deflect. Further, the twisting of the neck portions 64 in the hinge can create a restoring force to assist in deflecting the mirror back from one position to another.

As can be well appreciated by one of ordinary skill in the art, the spring member 50 can include various configurations without departing from the scope of the present invention. As such, the spring member 50 of the present invention is not limited to the structure described and depicted in the drawing figures illustrated herein.

The mirror 70 can be, but is not limited to, a generally rectangular or square shape or any other suitable shape known in the art. The mirror 70 can include a reflective surface 72 and an opposite under-side surface 74. The mirror 70 can be generally the size of, but is not limited to, the device region 24 of the substrate 20. The mirror 70 can be positioned and coupled centrally to the upper support member 38 at the under-side surface 74 of the mirror 70. As such, the mirror 70 can be disposed above and spaced apart from the spring member 50 while in the neutral position. The mirror 70 can define a first side portion 76 and a second side portion 78 with a central axis 79 defined therebetween. With the mirror 70 coupled to the upper support member 38, the mirror 70 is configured to pivot about the central axis 79 via the central portion 60 of the spring member 50 as previously described. In this manner, the first and second side portions 76 and 78 of the mirror 70 can be configured to pivotally deflect up and down or more generally, deflect between a first position and second position, described in further detail below.

The mirror 70 can be formed of a generally rigid material with the reflective surface 72 facing upward. In one embodiment, the mirror 70 can be formed of a uniform material having suitable reflectivity to provide the reflective surface and suitable conductivity to deflect in response to the electrostatic force, such as aluminum and/or alloys thereof, or titanium nitride, or any other suitable material known in the art. In another embodiment, the mirror can be formed of a base material or core material, such as polysilicon, with a reflective and conductive material formed over the base material, such as aluminum and/or alloys thereof, or titanium nitride, or any other suitable material known in the art.

With respect to FIG. 2, in one embodiment, as previously set forth, the spring member 50 and mirror 70 can be immersed in a dielectric liquid 80. The dielectric liquid 80 can be transparent. As such, the dielectric liquid 80 can be clear or colorless in the visible spectrum. In addition, the dielectric liquid 80 can be chemically stable in electric fields, chemically stable with changes in temperature, and chemically inert. The dielectric liquid 80 can provide a low vapor pressure and can be non-corrosive. Furthermore, the dielectric liquid 80 can have a high molecular orientation in electric fields and can move in an electric field. The dielectric liquid 80 can have a low dielectric constant and a high dipole moment. The dielectric liquid 80 can be any suitable dielectric liquid, such as phenyl-ethers, either alone or in blends (i.e., 2, 3, and 5 ring), phenyl-sulphides, and/or phenyl-selenides, or any other suitable dielectric liquid known in the art. In one embodiment, the dielectric liquid can be a polyphenyl ether (PPE), such as OS138 and olive oil.

The plate 84 is disposed over the dielectric liquid 80. The plate 84 can be oriented substantially parallel to the upper surface 22 of the substrate 20 and spaced from the upper surface 22 so that the spring member 50 and mirror 70 is disposed between the plate 84 and substrate 20. The plate 84 can be a transparent plate formed from any suitable material, such as glass, plastic, quartz, or any other suitable material known in the art. The plate 84 is transparent to facilitate light passing therethrough and reflect against the reflective surface 72 of the mirror 70. As well known by those of ordinary skill in the art, this aspect of the mirror 70 reflecting light through the plate 80 can be readily implemented in various applications as previously set forth, but not limited thereto.

Referring now to FIGS. 2–5, the micro-mirror device 10 is depicted in various positions some of which depict the mirror 70 and spring member 50 being deflected in response to the electrostatic force. With respect to FIG. 2, the micro-mirror device 10 is depicted in a neutral position with the spring member 50 and mirror 70 spaced apart above the substrate 20 with the lower support members and upper support member as previously set forth.

Figure 3:
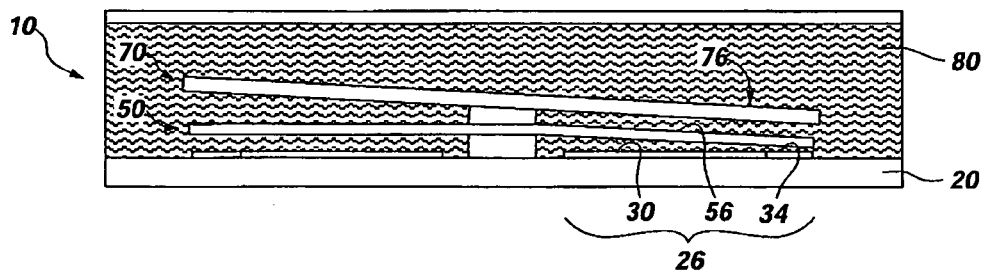
FIG. 3 illustrates a side view of the micro-mirror device, depicting the spring member and mirror in a partially deflected position, according to an embodiment of the present invention.

FIG. 3 illustrates the mirror 70 and the spring member 50 initially being deflected in response to the electrostatic force. At this stage, voltage is being applied to one or more first address electrodes 30 on the first side 26 of the substrate 20 to provide the electrostatic force. Voltage can also be applied to the landing pads 34 on the first side 26 of the substrate 20 to enhance the electrostatic force directed to the spring member 50 and the mirror 70. In response to the electrostatic force, the first elongate portions 56 of the spring member 50 and the first side portion 76 of the mirror 70 deflect downward toward the first side 26 of the substrate 20. Such deflection of the spring member 50 and the mirror can be a simultaneous deflection. Significantly, the first elongate portions 56 of the spring member 50 deflect discreetly and separately from the first side portion 76 of the mirror 70 and in response to the electrostatic force. As such, the mirror 70 does not contact the spring member 50 while deflecting and, therefore, the spring member 50 does not resist the deflection of the mirror 70. Thus, there is substantially no energy loss in the mirror 70 while deflecting downward. In this manner, prior to the spring member 50 reaching a maximum deflection or first position (FIG. 4), the spring member and mirror are separate and discrete from each other with no direct contact therebetween. In one embodiment, the spring member 50 can deflect independent of the mirror 70.

Figure 4:
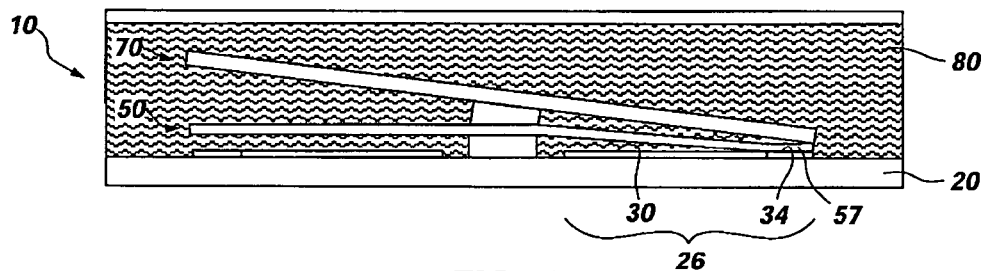
FIG. 4 illustrates a side view of the micro-mirror device, depicting the spring member and mirror fully deflected in a first position, according to an embodiment of the present invention.

With respect to FIG. 4, once the first end portions 57 of the spring 50 contact the landing pads 34 on the first side 26 of the substrate 20, the mirror 50 continues to deflect to directly contact an upper surface of the first end portions 57 of the spring member 50. At this stage, the spring member 50 is in a maximum deflected position or first position. As such, maximum potential energy is stored in the spring member 50 in the maximum deflected position. Further, the spring member 50 can be configured to increasingly store potential energy as the spring member 50 begins to deflect from the neutral position (FIG. 2) to the maximum deflected position. Further, the mirror 70 also is deflected to the first position, which is a maximum deflection of the mirror 70 toward the first side 26 of the substrate 20. The voltage can then be released in the one or more first address electrodes 30, to thereby release the potential energy in the spring member 50 and pivotally force the first side portion 76 of the mirror 70 upward, as depicted in FIG. 5.

Figure 5:
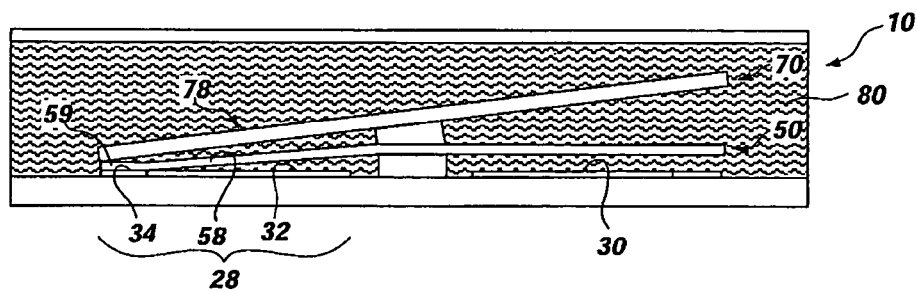
FIG. 5 illustrates a side view of the micro-mirror device, depicting the spring member and mirror fully deflected in a second position, according to an embodiment of the present invention.

With respect to FIG. 5, as optimized for mirror architecture/fluid systems, simultaneously, or immediately after the voltage is released in the one or more first address electrodes 30, the voltage can then be applied in the one or more second address electrodes 32. As such, similar to that described in FIGS. 3 and 4, the second elongate portions 58 of the spring member 50 and the second side portion 78 of the mirror 70 are discretely deflected toward the second side 28 of the substrate 20 in response to the electrostatic force applied through the second address electrodes 32. Once the second end portions 59 of the second elongate portions 58 contact the landing pads 34 on the second side 28 of the substrate 20, the mirror 70 then continues to deflect and contact the upper surface of the second elongate portions 58. At this stage, the mirror 70 and the spring member 50 are deflected to a second position, which is a maximum deflection for both the spring member 50 and the mirror 70 toward the second side 28 of the substrate 20. The voltage is then released in the one or more second electrodes 32, thereby releasing the electrostatic force effected thereby to release the potential energy stored in the second elongate portions 58 to assist in pivotally forcing the second side portion 78 of the mirror 70 upward.

The above described process, depicted in FIGS. 3–5, can be repeated by alternately applying voltage to the respective first and second electrodes 30 and 32 to actuate and alternately deflect the mirror 70 downward toward the respective first and second sides 26 and 28 of the substrate 20. With this arrangement, the spring member 50 in the micro-mirror device 10 is configured to assist in the speed and frequency by which the mirror 70 can pivot or actuate between the first and second positions. Further, with the spring member 50 assisting in the actuation of the mirror 70 between the first and second positions, the dampening effect of the dielectric liquid 80 is alleviated resulting in more controlled and increased frequency in the actuation of the micro-mirror device 10. For example, the micro-mirror device 10 of the present invention, disposed in the dielectric liquid 80, is approximately 5–7 micro-seconds quicker in moving between the first and second positions than the conventional micro-mirror device also disposed in a dielectric liquid. As such, the increased speed and frequency of the micro-mirror device 10 can provide greater control in switching the mirror 70 between the first and second positions as well as to the neutral position.

Figure 6:
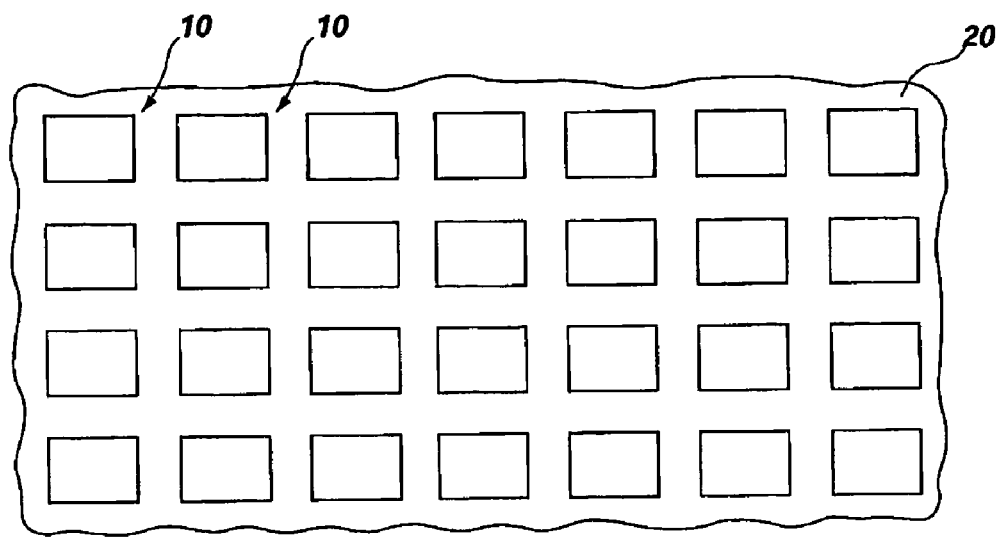
FIG. 6 illustrates a partial top view of an array of micro-mirror devices, according to an embodiment of the present invention.

With respect to FIG. 6, in one embodiment, the micro-mirror device of the present invention can be formed in an array of micro-mirror devices 10 on the substrate 20 in columns and rows. The array of micro-mirror devices 10 can be used in a display (not shown), as known by one of ordinary skill in the art, so that each micro-mirror device 10 constitutes a light modulator for modulation of incident light and provides one cell or pixel of the display. Further, as known by one of ordinary skill in the art, the micro-mirror device formed in the array of micro-mirror devices 10 can be used in various imaging systems, such as projectors and/or video applications, or any other suitable imaging system known in the art.

Each of the components of the above-described micro-mirror device 10 can be fabricated utilizing techniques well known in the art. Examples of some fabrication techniques that can be used in forming the micro-mirror device 10 can include photolithography, various vapor deposition techniques, and various etching techniques, or any other suitable fabrication methods and processes known in the art. As such, one of ordinary skill in the art with the above-description of the micro-mirror device 10 can readily implement the well known fabrication techniques to form the micro-mirror device 10.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A micro-mirror device, comprising:

a substrate;

at least one address electrode positioned over the substrate and configured to provide an electrostatic force;

at least one support member positioned over the substrate and extending upward above the substrate;

a mirror disposed over the at least one address electrode and coupled to the at least one support member, the mirror configured to deflect toward the substrate in response to the at least one address electrode applying the electrostatic force to a portion of the mirror; and a spring member spaced apart between the substrate and the mirror and coupled to the at least one support member, the spring member being operable to deflect independently from the mirror and toward the substrate.

2. The micro-mirror device of claim 1, wherein the spring member is operable to assist in forcing the mirror upward when the electrostatic force is released.

3. The micro-mirror device of claim 1, wherein the mirror comprises first and second side portions with a central axis defined therebetween, the mirror being operable to pivot about the central axis between a first and second position with the spring member configured to assist in pivoting the mirror to at least one of the first and second positions.

4. The micro-mirror device of claim 3, wherein the spring member is configured to store energy between a neutral position and a maximum deflected position and releases the stored energy to assist in alternately forcing the mirror upward to at least one of the first and second positions.

5. The micro-mirror device of claim 1, wherein the spring member is operable to assist in controlling a frequency of the mirror deflecting between a first position and a second position.

6. The micro-mirror device of claim 1, further comprising a dielectric liquid configured to immerse at least the spring member and the mirror.

7. The micro-mirror device of claim 1, wherein the spring member comprises a piezoelectric element and is configured to deflect in response to the piezoelectric element.

8. The micro-mirror device of claim 1, wherein the substrate comprises logic circuitry formed therein configured to control the at least one address electrode.

9. A display apparatus, comprising:
multiple micro-mirror devices formed in an array on a substrate, at least one of the micro-mirror devices including:
  at least one address electrode positioned over the substrate and configured to provide and electrostatic force;
  at least one support member positioned over the substrate and extending upward above the substrate;
  a mirror disposed over the at least one address electrode and coupled to the at least one support member, the mirror configured to deflect toward the substrate in response to the at least one address electrode applying the electrostatic force to a portion of the mirror; and
  a spring member spaced apart between the substrate and the mirror and coupled to the at least one support member, the spring member being operable to deflect independently from the mirror and toward the substrate.

10. The display apparatus of claim 9, wherein the spring member is operable to assist in forcing the mirror upward when the electrostatic force is released.

11. The display apparatus of claim 9, wherein the spring member comprises a piezoelectric element and is configured to deflect in response to the piezoelectric element.

* * * * *